Sept. 28, 1954        J. E. HARRIS        2,690,464
STORAGE BATTERY GRID
Filed Oct. 22, 1952
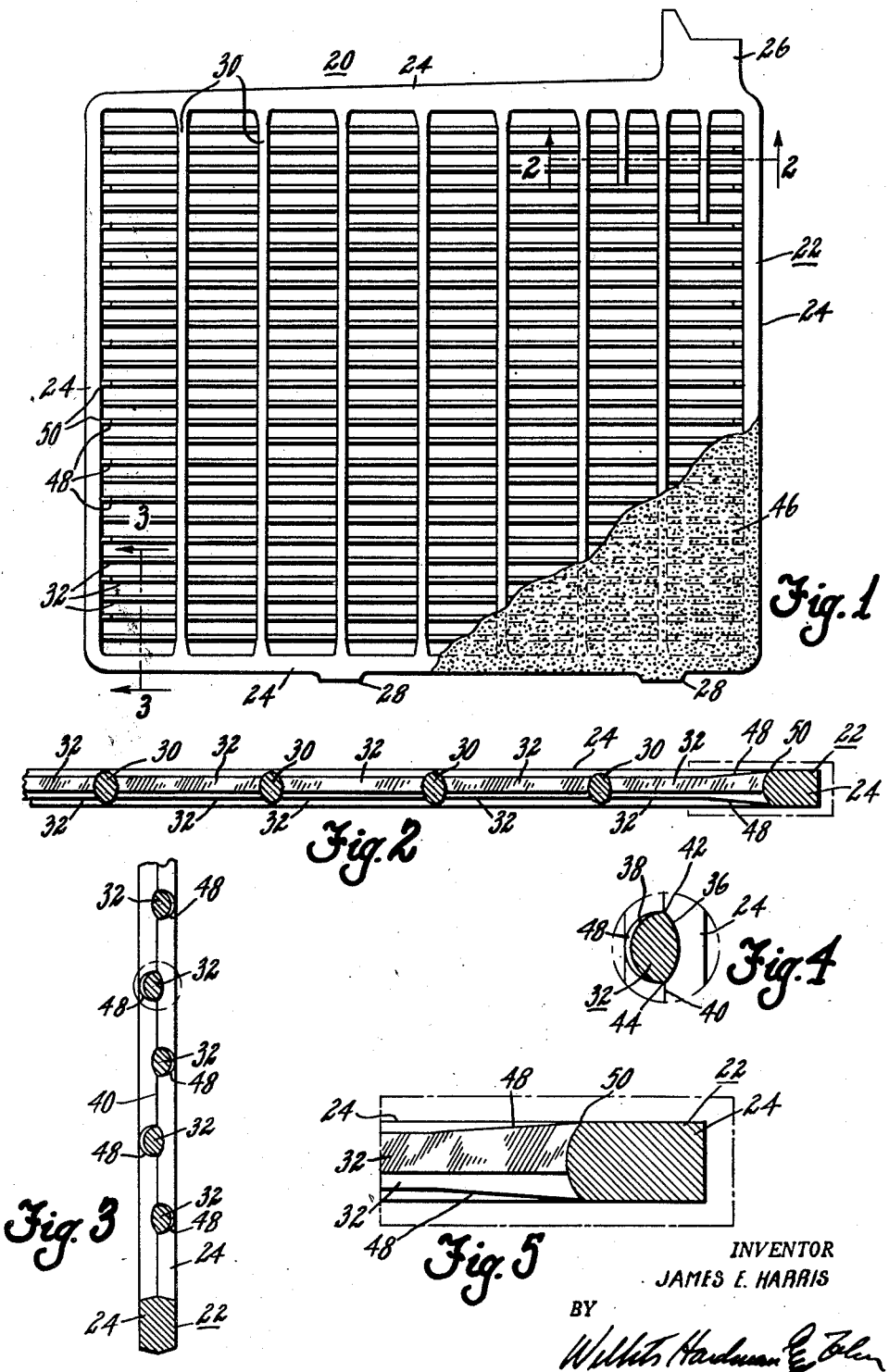
INVENTOR
JAMES E. HARRIS
BY
HIS ATTORNEYS Patented Sept. 28, 1954

2,690,464

UNITED STATES PATENT OFFICE 2,690,464

STORAGE BATTERY GRID

James E. Harris, Eaton, Ind., assignor to General Motors Corporation, Detroit, Mich., a corporation of Delaware Application October 22, 1952, Serial No. 316,190

7 Claims. (Cl. 136—36)

The invention is directed to a storage battery and is more particularly concerned with a new and novel grid structure therefor.

It is an object of the invention to provide a storage battery plate in which the entire skeleton of the grid will be covered by active material.

A further object of the invention is to provide a grid structure for a storage battery plate wherein relatively thin grid wires are located beneath the planes of the faces of the frame whereby said frame may be machined to various thicknesses without changing the configuration or thickness of the grid wires.

Another object of the invention is to provide a grid structure having thin wires thereon that is adapted to be stacked and fed into a pasting machine requiring plates to be slidable over each other.

A more specific object of the present invention is to provide a grid for a storage battery plate wherein relatively indestructible wires forming paste retaining elements are thinner than the frame of the grid. These wires are to be located and shaped to effectively maintain the paste on the grid; and have fillets at intersections of the wires and frame members which will provide a riding surface for the plates as the plates are slid over each other during the pasting process.

Further objects and advantages of the present invention will be apparent from the following description, reference being had to the accompanying drawings wherein a preferred embodiment of the present invention is clearly shown.

In the drawings:

Fig. 1 is a plan view of a battery grid employing the present invention.

Fig. 2 is an enlarged sectional view along line 2—2 of Fig. 1.

Fig. 3 is an enlarged sectional view along line 3—3 of Fig. 1.

Fig. 4 is an enlarged fragmentary cross sectional view of one of the paste holding wires.

Fig. 5 is an enlarged fragmentary cross sectional view of a fillet at the intersection of one of the grid wires and frame.

In the drawings and in Figure 1 particularly, a storage battery plate grid structure 20 employing the present invention is shown. This grid is made from suitable alloys of lead such as are well known in the art. The grid 20 which is formed with a border or frame 22 of relatively heavy wire-like elements 24 has the usual terminal lug 26 and support pads 28 integrally formed on the frame.

The paste retaining network within the frame 24 is made up of a plurality of substantially vertical wires 30 and substantially horizontal wires 32. The vertical wires 30 as shown in Fig. 2 are elliptical in shape and are thinner than the frame members 24 when viewed through the face of the plate. The rounded horizontal wires 32, which are thinner than wires 30 have a shape defined by two arcs 36 and 38 of different radii as shown in the enlarged view in Fig. 4 and are located in the plates as shown in Figs. 1 and 3, wherein the center line 40 of the plate passes through the intersections 42 and 44 of the arcs 36 and 38. The alternate facing and shape of the wires 32 provide a structure combining a relatively high rigidity as provided by the area formed by the arc of smaller radius 38 with the maximum amount of paste retaining area as presented by the surface formed by the arc of larger radius 36. This arrangement makes possible the use of relatively thin wires having a high structural strength so as to be relatively indestructible as an effective paste 46 holding means on a battery grid. It is to be further noted that the frame of the grid's structure as described may be machined to various thicknesses without changing the configuration or thickness of the grid wires with a method and for a purpose to be hereinafter described.

In modern battery manufacture, grids are pasted in automatic pasting machines, such as disclosed in the United States patent to Lund No. 2,031,943. In this type of pasting machine a plurality of grids are stacked in a chamber and are stripped off one at a time from the stack and are moved forwardly by a stripping plate into the pasting machine. If a battery grid as previously described were utilized in this pasting machine, the trailing edge of the plate entering the machine would hook behind the thicker frame portion of the leading edge of the plate remaining in the stack and thereby render this type of plate unsuitable for use in the type of pasting machine indicated.

The foregoing problem is solved in the present instance by the addition of fillets 48 as shown in cross-section in Fig. 5, which are located at intersection 50 of the thinner wires with the heavy frame members. These fillets will provide a riding surface for the plates and permit the transverse sliding of one plate over the surface of another. It is to be further noted that the fillets 48 will also act as additional strengthening means for the thin wires when the plate is placed in service.

From the foregoing it can be seen that the use of a plurality of thin wires to form a paste holding network in a battery grid will result in an improved paste retaining structure. This invention is particularly directed to an improved battery grid structure wherein thin wires having a shape defined by two intersecting arcs of different radii are alternately faced on the center line with the intersection of the arcs located on said line; and have fillets at the intersection of the thin wires with the frame members to permit the use of this plate in an automatic pasting machine.

Another advantage of the plate as disclosed is its flexibility for use wherein plates of different thicknesses may be required. The plate as disclosed may be run through a milling machine and have its frame milled down to the desired size without in any way affecting the paste retaining wires of the grid and thus be usable in a multiplicity of types of batteries.

While the embodiment of the present invention as hereindisclosed constitutes a preferred form, it is to be understood that other forms might be adopted.

What is claimed is as follows:

1. A grid for a storage battery plate comprising, a wire-like frame, a plurality of wires forming a network within the frame, said wires having a diameter less than the wires of the frame, and fillets at intersections of the frame and wires, said fillets providing an unrestricted sloping portion joining the surface of the frame with the corresponding surfaces of the connecting wires.

2. A grid for a storage battery plate comprising, a plurality of wires forming a frame, a plurality of thinner wires forming a paste retaining network within the frame, said thinner wires having a rounded cross sectional shape, alternately staggered and oppositely faced on a center line of the frame, and fillets at intersections of the frame and wires said fillets providing an unrestricted sloping portion joining the surface of the frame with the corresponding surfaces of the connecting wires.

3. A grid for a storage battery plate comprising, a plurality of wires forming a frame, a plurality of thinner wires within the frame, said thinner wires having a rounded cross section and alternately staggered and oppositely faced on a center line of the frame, and fillets at intersections of the frame and wires, said fillets providing an unrestricted sloping portion joining the surface of the frame with the corresponding surfaces of the connecting wires.

4. A grid for a storage battery plate comprising, a frame of wire-like elements, a plurality of relatively indestructible wires forming a network within the frame, said wires having a diameter less than the diameter of the frame wires and a cross sectional shape defined by the intersections of two arcs of different radii, said wires alternately faced in spaced relation on opposite sides of a center line of the grid with the intersections of the arcs on said center line, and fillets at intersections of the frame and wires.

5. A grid for a storage battery plate adapted for use in a pasting machine wherein one grid is slid over another grid in a stack of grids comprising, in combination; a wire-like frame, a plurality of wires forming a network within the frame, said wires having a smaller cross sectional area than the wires of the frame, and fillets at intersections of the frame and wires, said fillets adapted to permit unimpeded sliding of one grid on another.

6. In a storage battery grid adapted to be used in an automatic pasting machine wherein the grids are slid over each other from a stack of grids, a fillet for a grid structure having a wire-like frame and a plurality of relatively thin wires forming a network within the frame, said fillet located at the intersection of the wires and the frame and adapted to permit unimpeded sliding of one grid over another.

7. A storage battery plate grid adapted for use in a pasting machine wherein one grid is slid over another grid in a stack of grids comprising, a wire-like frame, a plurality of wires forming a paste retaining network within the frame, said wires having a smaller diameter than wires of the frame and a cross sectional shape defined by the intersections of two arcs of different radii, said wires alternately faced in spaced relation on opposite sides of a center line of the grid with the intersections of the arcs on said center line and dimensioned to have the planes tangent to at least two arcs of the wires nearer the center line of the grid than the planes tangent at least to two frame members, and fillets at intersections of the wire and frame members, said fillets adapted to permit one grid to unimpededly slide over another.

References Cited in the file of this patent

UNITED STATES PATENTS

| Number | Name | Date |
|--------|------|------|
| 1,183,807 | Everett | May 16, 1916 |
| 1,608,469 | Daniel | Nov. 23, 1926 |
| 1,907,189 | Reinhardt | Aug. 14, 1934 |
| 2,625,574 | Fuller | Jan. 13, 1953 |